United States Patent [19]
Sanpei

[11] Patent Number: 5,237,259
[45] Date of Patent: Aug. 17, 1993

[54] CHARGING METHOD FOR SECONDARY BATTERY

[75] Inventor: Akira Sanpei, Fukushima, Japan

[73] Assignee: Sony Corporation, Tokyo, Japan

[21] Appl. No.: 790,563

[22] Filed: Nov. 12, 1991

[30] Foreign Application Priority Data

Nov. 13, 1990 [JP] Japan .................................. 2-306876

[51] Int. Cl.⁵ ................................................ H02J 7/00
[52] U.S. Cl. .......................................... 320/23; 320/31; 320/37; 320/39
[58] Field of Search ..................... 320/23, 24, 31, 32, 320/39, 40, 37, 38

[56] References Cited

U.S. PATENT DOCUMENTS

| | | | |
|---|---|---|---|
| 3,887,858 | 6/1975 | Burkett et al. | 320/31 |
| 3,944,904 | 3/1976 | Hase | 320/23 |
| 4,207,513 | 6/1980 | Hess, Jr. | 320/23 |
| 4,209,736 | 6/1980 | Reidenbach | 320/32 X |
| 4,647,834 | 3/1987 | Castleman | 320/31 X |

*Primary Examiner*—R. J. Hickey
*Attorney, Agent, or Firm*—Hill, Steadman & Simpson

[57] ABSTRACT

A method of charging a secondary battery by means of a constant voltage power source for supplying a limited current. The method includes a first step of charging the secondary battery until a predetermined condition is reached, and a second step of further charging the secondary battery for a predetermined period of time after the predetermined condition is reached. Accordingly, overcharge of the secondary battery can be surely prevented.

1 Claim, 5 Drawing Sheets

CHARGING METHOD FOR SECONDARY BATTERY

BACKGROUND OF THE INVENTION

The present invention relates to a method of charging a secondary battery by means of a constant voltage power source for supplying a limited current, and more particularly to prevent overcharge.

A nonaqueous electrolyte secondary battery of rechargeable secondary batteries provides a high battery voltage (e.g., 4.1 V), a high energy density, and a superior cycle characteristic. For these advantages, the nonaqueous electrolyte secondary battery is used as a memory backup or a power source for various electronic equipments. Such a nonaqueous electrolyte secondary battery may be constructed by employing a carbonaceous material as a negative electrode, a lithium compound as a positive electrode, and a nonaqueous electrolytic solution of an electrolyte in a nonaqueous solvent as a nonaqueous electrolyte.

As a method of charging a secondary battery such as the above-mentioned nonaqueous electrolyte secondary battery, there is known a charging method using a constant voltage power source for supplying a limited current (which will be hereinafter referred to as a current limiting constant voltage power source). According to the charging method using the current limiting constant voltage power source, a maximum current and a maximum voltage of the power source can be decided regardless of a discharging amount (remaining charge capacity) of the battery. Accordingly, a charging circuit in a battery charger can be simplified in construction.

FIG. 7 shows a charging pattern schematically representing a charging curve in case of charging a nonaqueous electrolyte secondary battery by means of the current limiting constant voltage power source as mentioned above.

In the case that a battery voltage of the nonaqueous electrolyte secondary battery is lower than a maximum voltage of the current limiting constant voltage power source, a charging current I is supplied from the power source to the battery with a maximum current $I_p$ limited at a constant value, thereby charging the battery. During the supply of the constant maximum current $I_p$, a battery voltage V gradually rises.

When the battery voltage V reaches a maximum voltage $V_p$ of the power source, the maximum voltage $V_p$ is limited at a constant value to proceed with subsequent charging. At the same time, the charging current I starts lowering from the maximum current $I_p$.

In such a charging method, overcharge of the battery may be avoided by ending the charging after a predetermined period $T_0$ of time has elapsed from a charge start timing.

The maximum voltage of the current limiting constant voltage power source for charging the nonaqueous electrolyte secondary battery may be set to 4.1 V, for example, and the maximum current of the power source may be set to normally about 0.1-1.0 C (nominal capacity or rated capacity) amperes depending on a charging time (a period of time for fully charging the battery).

FIG. 8 shows a charging pattern schematically representing a charging curve in case of charging a nickel-cadmium secondary battery according to a conventional method.

In the case that the nickel-cadmium secondary battery is charged by a battery charger including a constant current power source, a constant charging current I flows in the battery, and a battery voltage V gradually rises to reach a peak voltage $V_p'$, thereafter lowering. During the lowering of the battery voltage V, the battery charger detects the time when the battery voltage V becomes $(V_p' - \Delta V)$, and stops the charging. In this case, to compensate a self-discharge amount while the battery is in connection with the battery charger, a minute charging current as shown by a dashed line in FIG. 8 may be successively supplied.

In this way, overcharge of the nickel-cadmium secondary battery is prevented. Such measures for preventing the overcharge are effective particularly in case of quickly charging the nickel-cadmium secondary battery with a large current. That is, the nickel-cadmium secondary battery usually includes a mechanism for absorbing a gas to be generated by decomposition of an electrolytic solution upon overcharging. However, in case of charging the battery with a large current, there is a possibility that the gas cannot be sufficiently absorbed by the absorbing mechanism.

On the other hand, the nonaqueous electrolyte secondary battery does not include such an absorbing mechanism for absorbing a gas to be generated by decomposition of an electrolytic solution due to overcharge. Accordingly, if an overcharged condition of the battery continues, there is a possibility that a life of the battery is shortened.

As apparent from the charging pattern of the nonaqueous electrolyte secondary battery shown in FIG. 7, the charging current of the battery does not become zero, but continues to flow with a minute current even after the battery voltage becomes the maximum voltage of the power source. This is due to the fact that the decomposition of the nonaqueous electrolytic solution occurs minutely in the battery to consume a minute current. If this condition continues, the battery is overcharged.

To prevent such overcharge, as previously mentioned, there has been conventionally proposed a technique of stopping the charging after the predetermined period $T_0$ has elapsed from the charge start timing. However, this technique has the following problem.

That is, the predetermined charging period $T_0$ is decided on the basis that a charge capacity of the battery hardly remains in the battery. Therefore, if a battery with a charge capacity still remaining is charged by the aforementioned method, the battery is overcharged because it is always charged for the predetermined period $T_0$.

In practice, charging of a battery with a remaining charge capacity often happens, and it is therefore important to prevent the aforementioned overcharge.

SUMMARY OF THE INVENTION

It is accordingly an object of the present invention to provide a charging method for a secondary battery which can positively prevent the overcharge of the secondary battery.

In accordance with one aspect of the present invention, there is provided a method of charging a secondary battery by means of a constant voltage power source for supplying a limited current, said method comprising a first step of charging said secondary battery until a predetermined condition (a predetermined battery voltage $V_t$ or a predetermined charging current $I_t$) is reached, and a second step of further charging said secondary battery for a predetermined period $T_1$ or $T_2$ of time after said predetermined condition is reached. More concretely, the secondary battery is charged until a battery voltage V of the secondary battery rises to a predetermined voltage $V_t$, and thereafter the secondary battery is further charged for a predetermined period $T_1$ of time. Alternatively, the secondary battery is charged until a charging current of the secondary battery lowers to a predetermined current $I_t$, and thereafter the secondary battery is further charged for a predetermined period $T_2$.

In accordance with a further aspect of the present invention, there is provided a trickle charging method adapted to be applied to the secondary battery charged to a degree such that the battery voltage V rises to the predetermined voltage $V_t$ by the charging method of the present invention, comprising the step of repeatedly charging the secondary battery for a predetermined period $T_3$ of time every time the battery voltage V lowers to a predetermined voltage $V_t'$.

In accordance with a still further aspect of the present invention, there is provided a trickle charging method adapted to be applied to the secondary battery charged to a degree such that the charging current I lowers to the predetermined current $I_t$ by the charging method of the present invention, comprising the step of repeatedly charging the secondary battery after a predetermined period $T_4$ of time has elapsed until the charging current I lowers to a predetermined current $I_t'$ and then further charging the secondary battery for a predetermined period $T_5$ of time.

According to the charging method of the present invention, even if a charge capacity remains in the secondary battery to be charged, the secondary battery is first charged until the predetermined condition is reached, irrespective of the remaining charge capacity, and is then further charged for the predetermined period. Accordingly, the secondary battery is charged under a constant condition irrespective of the remaining charge capacity, thereby preventing overcharge of the secondary battery.

Other objects and features of the invention will be more fully understood from the following detailed description and appended claims when taken with the accompanying drawings.

DETAILED DESCRIPTION OF THE PREFERRED EMBODIMENTS

There will now be described some preferred embodiments of a charging method for a nonaqueous electrolyte secondary battery according to the present invention with reference to the drawings.

First Preferred Embodiment

Figure 1:
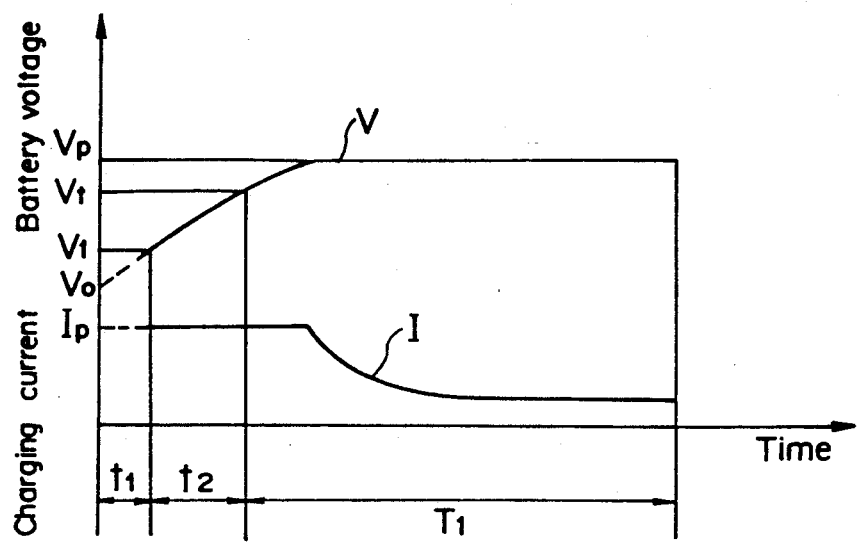
FIG. 1 is a graph illustrating a charging pattern according to a first preferred embodiment of the present invention.
Figure 2:
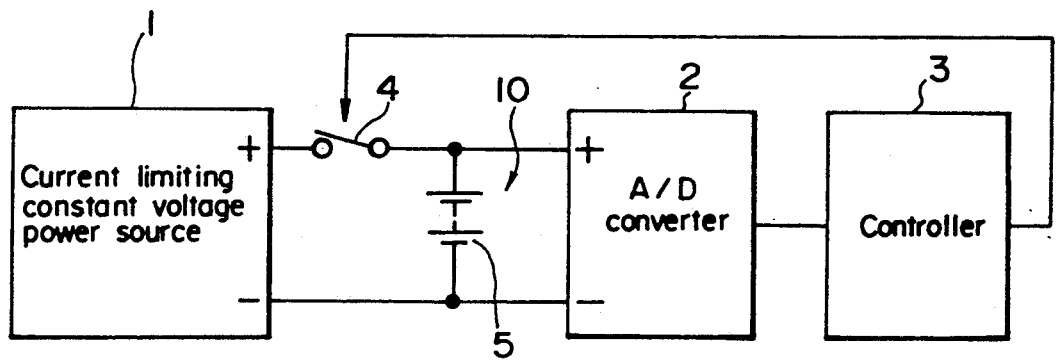
FIG. 2 is a block diagram of a charging device for realizing the charging pattern shown in FIG. 1.

A charging pattern according to a first preferred embodiment of the charging method is shown in FIG. 1, and a charging device which can realize the first preferred embodiment is shown in FIG. 2 by a block diagram.

Referring to FIG. 1, there are shown charging curves of a battery voltage V and a charging current I in terms of an elapsed time in case of charging a nonaqueous electrolyte secondary battery. As shown in FIG. 1, after the battery voltage V rises from a charge starting battery voltage $V_1$ to a predetermined battery voltage $V_t$, the battery is further charged for a predetermined period $T_1$ of time.

The charging device shown in FIG. 2 is constituted of a current limiting constant voltage power source 1, a battery assembly 10 formed by combining a plurality of nonaqueous electrolyte secondary batteries 5, a switch 4 for operatively connecting the current limiting constant voltage power source 1 to the battery assembly 10, an A/D converter 2 connected to the battery assembly 10, and a controller 3 connected to the A/D converter 2, so that the battery voltage V of the battery assembly 10 is monitored by the controller 3 through the A/D converter 2.

The controller 3 includes a timer (not shown), and controls the switch 4 to turn on and off. The controller 3 detects that the battery voltage V has reached the predetermined voltage $V_t$, and then it operates the timer to turn off the switch 4 after the predetermined period $T_1$ of time has elapsed.

The charging pattern shown in FIG. 1 can be obtained by the charging device shown in FIG. 2 as follows:

When the switch 4 is turned on by the controller 3, charging is started in the battery assembly 10 having a charge starting battery voltage $V_1$ to gradually raise the battery voltage V. Thereafter, when the battery voltage V reaches the predetermined voltage $V_t$, the timer in the controller 3 starts to operate. During the operation of the timer, the battery voltage V is further raised from the predetermined voltage $V_t$ to a maximum voltage $V_p$ which is limited at a constant level by the power source 1. Thereafter, the charging is continued with the constant maximum voltage $V_p$. After the predetermined period $T_1$ of time has elapsed from the operation timing of the timer, the switch 4 is turned off by the controller 3 to terminate the charging. On the other hand, the charging current I changes in substantially the same manner as that shown in FIG. 7.

Figure 7:
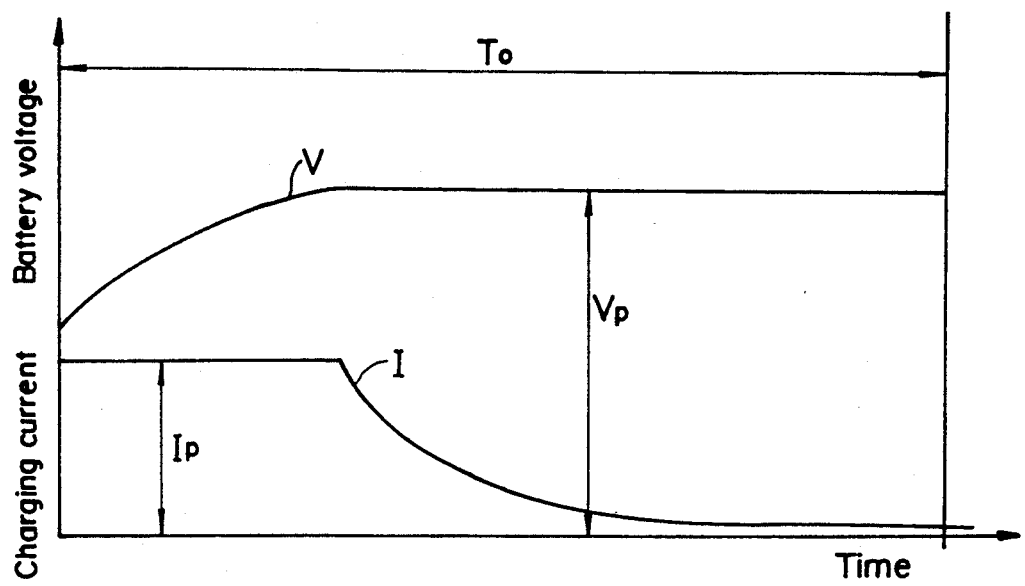
FIG. 7 is a graph illustrating a charging pattern in case of charging a nonaqueous electrolyte secondary battery by using a current limiting constant voltage power source according to a conventional charging method.
Figure 8:
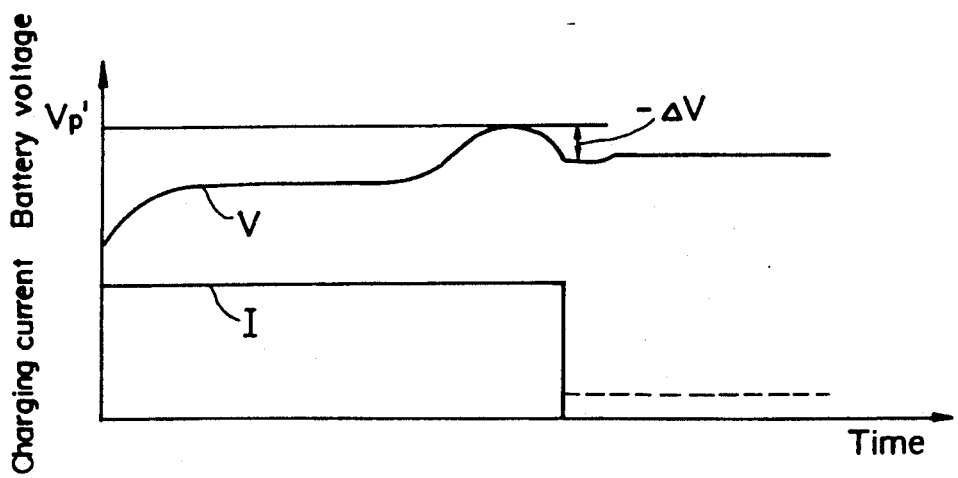
FIG. 8 is a graph illustrating a charging pattern in case of charging a nickel-cadmium secondary battery according to another conventional charging method.

Assuming that the battery voltage V in the condition where a remaining charge capacity of the battery is almost zero is represented as $V_0$; that a period of time till the battery voltage V rises from $V_0$ to $V_1$ as shown by a dashed line in FIG. 1 is represented as $t_1$; and that a period of time till the battery voltage V rises from $V_1$ to $V_t$ is represented as $t_2$, it can be considered that a total period $(t_1+t_2+T_1)$ of time is nearly equal to the charging period $T_0$ in the conventional charging method as previously illustrated in FIG. 7.

According to the charging method of the first preferred embodiment, even if a charge capacity remains in the battery assembly 10 to be charged, and accordingly a charge starting battery voltage is $V_1$ higher than $V_0$, the charging of the battery assembly 10 is first carried out until the battery voltage V is raised from $V_1$ to $V_t$, and is then continued for the predetermined period $T_1$ of time, thereby preventing overcharge corresponding to the period $t_1$ of time shown in FIG. 1. Accordingly, the charging can be carried out always under a constant condition irrespective of a remaining charge capacity of the battery to be charged, thus positively preventing overcharge.

Further, according to the charging method of the first preferred embodiment, a charging period can be reduced by $t_1$. On the contrary, if the battery having the voltage $V_1$ is charged according to the conventional method, overcharge corresponding to the period $t_1$ of time undesirably occurs.

In the case that the charge starting battery voltage $V_1$ is equal to or higher than $V_t$, the charging is stopped at this time to thereby positively prevent the overcharge. In this case, if sufficient charging is required, the charging may be carried out for a period of time shorter than the above predetermined period $T_1$ of time.

Figure 5:
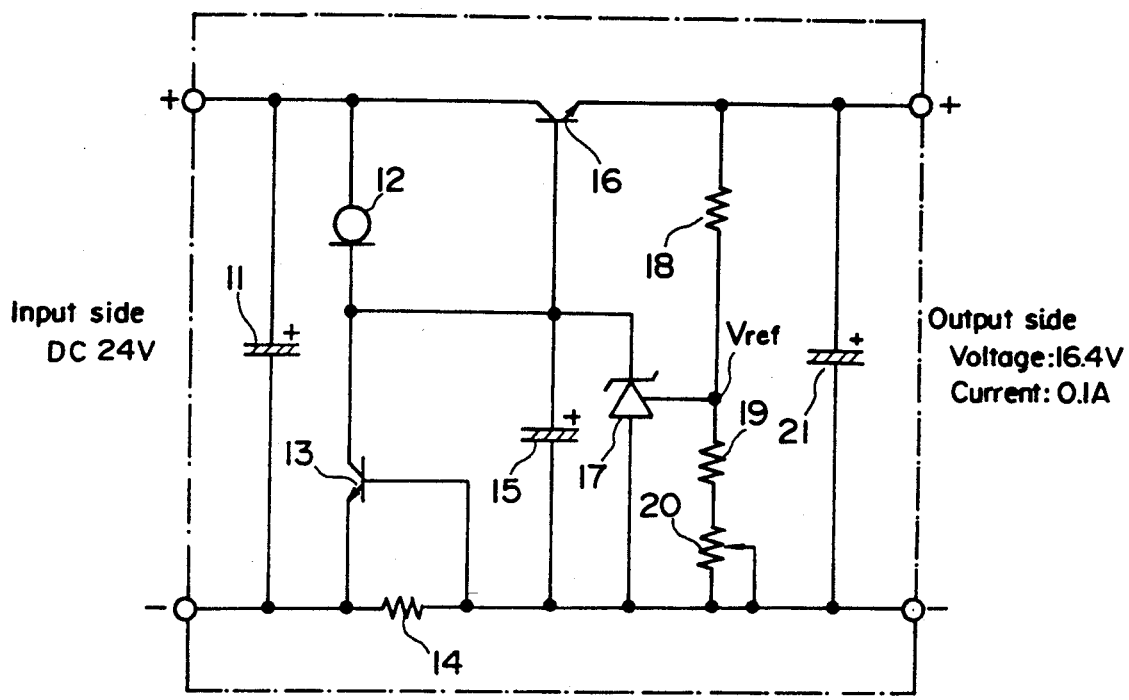
FIG. 5 is a circuit diagram of a current limiting constant voltage circuit which can be used in a current limiting constant voltage power source shown in FIGS. 2 and 5.

FIG. 5 shows an example of a current limiting constant voltage circuit which can be used in the current limiting constant voltage power source 1 shown in FIG. 2.

The current limiting constant voltage circuit includes a current limiting circuit constituted of a constant current diode 12, transistors 13 and 16, and a resistor 14, and also includes a constant voltage circuit constituted of a variable shunt regulator 17 and resistors 18, 19 and 20. Reference numerals 11, 15 and 21 denote capacitors.

When a secondary battery to be charged is connected as an output load to the circuit shown in FIG. 5, a constant charging current I is allowed to flow through the transistor 16 to the secondary battery. This charging current I is monitored according to a resistance value of the resistor 14. The resistance value of the resistor 14 depends on a maximum charging current $I_p$ to be limited and a predetermined voltage between the base and the emitter of the transistor 13. When the base-emitter voltage across the transistor 13 reaches a predetermined value, a current is allowed to flow between the collector and the emitter of the transistor 13 through the constant current diode 12. Therefore, the charging current I is prevented from exceeding the constant maximum charging current $I_p$.

On the other hand, an output voltage of the circuit shown in FIG. 5 is set by the variable shunt regulator 17 (e.g., TL431C manufactured by Texas Instrument Inc.) and the resistors 18, 19 and 20, and is controlled thereby so as to establish a constant maximum voltage. When a terminal $V_{ref}$ of the variable shunt regulator 17 reaches a reference voltage, the junction between the cathode and the anode of the variable shunt regulator 17 is broken down to thereby allow a current to flow between the cathode and the anode and control the output voltage to a constant value. A breakdown voltage between the cathode and the anode of the variable shunt regulator 17 depends on the ratio between the resistance value of the resistor 18 and a resistance value of the resistors 19 and 20, and can be adjusted to some degree by the variable resistor 20.

According to the circuit shown in FIG. 5, assuming that an input voltage is DC 24 V, for example, it is possible to realize current limiting constant voltage charging with a maximum voltage of 16.4 V and a maximum charging current of 0.1 A.

Second Preferred Embodiment

Figure 3:
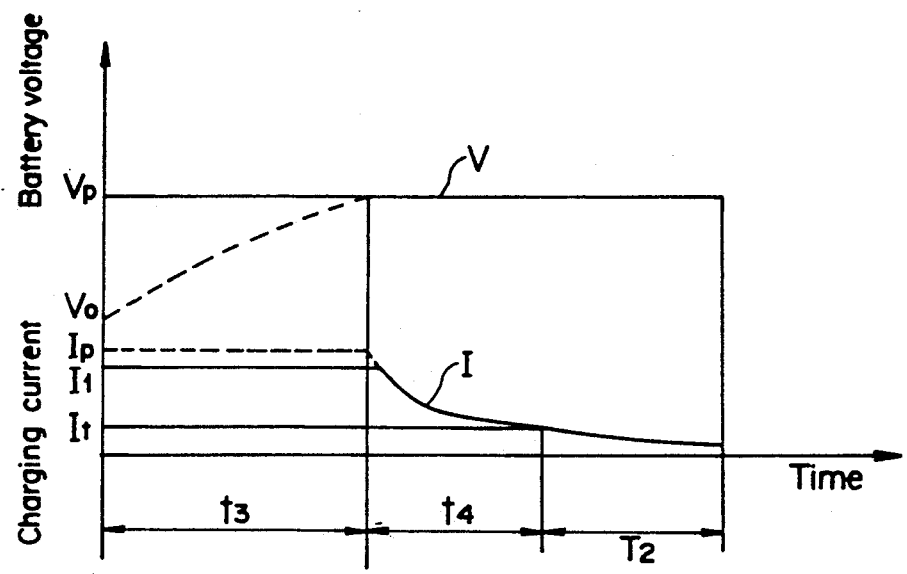
FIG. 3 is a graph illustrating a charging pattern according a second preferred embodiment of the present invention.
Figure 4:
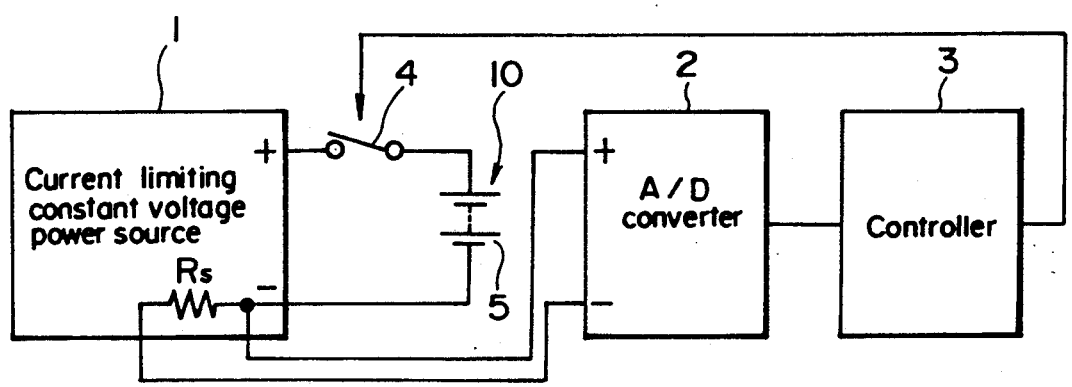
FIG. 4 is a block diagram of a charging device for realizing the charging pattern shown in FIG. 3.

A charging pattern according to a second preferred embodiment of the charging method is shown in FIG. 3, and a charging device which can realize the second preferred embodiment is shown in FIG. 4 by a block diagram. In FIGS. 3 and 4, the same reference numerals as those shown in FIGS. 1 and 2 denote the same parts, and the explanation thereof will be omitted hereinafter.

Similarly to the first preferred embodiment, the charging method of the second preferred embodiment is a method of charging a nonaqueous electrolyte secondary battery. Referring to FIG. 3, there are shown charging curves similar to those shown in FIG. 1, wherein after a charging current I reaches a predetermined charging current $I_t$, the battery is further charged for a predetermined period $T_2$ of time.

In the charging device shown in FIG. 4, the current limiting constant voltage power source 1 is provided with a current detecting resistor $R_s$. The charging current I flowing in the battery assembly 10 during charging is monitored as a voltage generated across the resistor $R_s$ by the controller 3 through the A/D converter 2. The resistor $R_s$ may be replaced by the resistor 14 in the circuit shown in FIG. 5.

The charging pattern shown in FIG. 3 can be obtained by the charging device shown in FIG. 4 as follows:

When the switch 4 is turned on by the controller 3, charging is started in the battery assembly 10 with a charge starting charging current $I_1$ to gradually lower the charging current I. Thereafter, when the charging current I reaches the predetermined current $I_t$, the timer in the controller 3 is operated to start. During the operation of the timer, the charging current I is further lowered from the predetermined current $I_t$. After the predetermined period $T_2$ of time has elapsed from the operation timing of the timer, the switch 4 is turned off by the controller 3 to terminate the charging. On the other hand, the battery voltage V changes in substantially the same manner as that shown in FIG. 7.

Assuming that the charging is started at a battery voltage $V_0$ (with a maximum charging current $I_p$); that a period of time till the charging current I lowers from $I_p$ to $I_1$ as shown by a dashed line in FIG. 3 is represented as $t_3$; and that a period of time till the charging current I lowers from $I_1$ to $I_t$ is represented as $t_4$, it can be considered that a total period $(t_3+t_4+T_2)$ of time is nearly equal to the charging period $T_0$ in the conventional charging method as previously illustrated in FIG. 7.

According to the charging method of the second preferred embodiment, even if a charge capacity remains in the battery assembly 10 to be charged, and accordingly a charge starting charging current is $I_1$ lower than $I_p$, the charging of the battery assembly 10 is first carried out until the charging current I is lowered from $I_1$ to $I_t$, and is then continued for the predetermined period $T_2$ of time, thereby preventing overcharge corresponding to the period $t_3$ of time shown in FIG. 3. Accordingly, the charging can be carried out always under a constant condition irrespective of a remaining charge capacity of the battery to be charged, thus positively preventing overcharge.

Further, according to the charging method of the second preferred embodiment, a charging period can be reduced by $t_3$. On the contrary, if the battery with the charging current $I_1$ is charged according to the conventional method, overcharge corresponding to the period $t_3$ of time undesirably occurs.

In the case that the charge starting charging current $I_1$ is equal to or lower than $I_t$, the charging is stopped at this time to thereby surely prevent the overcharge. In this case, if sufficient charging is required, the charging may be carried out for a period of time shorter than the above predetermined period $T_2$ of time.

CONCRETE EXAMPLE

The predetermined voltage $V_t$, the predetermined current $I_t$, and the predetermined charging periods $T_1$ and $T_2$ of time in the first and second preferred embodiments may be suitably set according to a maximum voltage V — maximum charging current I characteristic of the current limiting constant voltage power source 1, a characteristic of the nonaqueous electrolyte secondary battery 5, a construction of the battery assembly 10, a charging condition to be required, etc. The following is a concrete example according to the present invention.

Using a battery assembly formed by connecting in series four nonaqueous electrolyte secondary batteries each having a capacity of 400 mAH, was charged at a maximum voltage of 16.4 V and a maximum charging current of 0.1 A by a current limiting constant voltage power source having such a circuit as shown in FIG. 5. A charging pattern in this concrete example is shown in FIG. 6.

Figure 6:
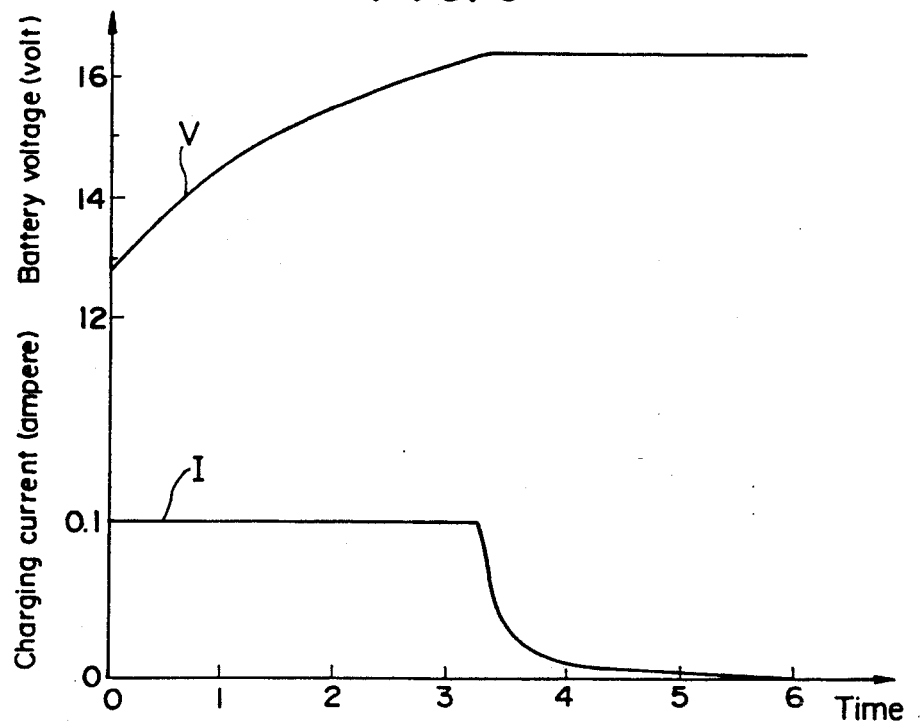
FIG. 6 is a graph illustrating a concrete example of the charging pattern according to the present invention.

The parameters $V_t$, $I_t$, $T_1$ and $T_2$ in the charging pattern shown in FIG. 6 are shown below in Table 1 by way of example.

TABLE 1

| First Preferred Embodiment | | Second Preferred Embodiment | |
|---|---|---|---|
| $V_t$ | 16.0 V | $I_t$ | 10 mA |
| $T_1$ | 2-3 hrs. | $T_2$ | 0.5-1.5 hrs. |

As to stoppage of charging, it may be considered to employ a method of stopping the charging such that a minute current to be consumed for decomposition of a nonaqueous electrolyte in the nonaqueous electrolyte secondary battery, which current is larger than a current to be consumed for charging, is detected near the end of the charging, and the charging is stopped if such a minute current is equal to or less than a certain value. However, such a charging current to be detected is a current at the time the charging has been sufficiently advanced, which is considerably minute as shown in FIG. 6. Moreover, since a rate of change in the current with respect to time near the end of the charging (i.e., a gradient of the charging curve) is considerably small, it is difficult to detect the charging current, and a considerably high cost is required for construction of a detecting device.

In contrast, according to the first preferred embodiment or the second preferred embodiment, a timing when a charging rate has not reached 100% is detected according to a battery voltage or a charging current. Accordingly, the detection is easily carried out. Further, since the charging is further continued from this detection timing for the predetermined period $T_1$ or $T_2$ ensuring sufficient charging and surely preventing overcharge. Thus, sufficient charging can be carried out without overcharge by a charging device having a simple construction.

APPLIED EXAMPLE

The charging method of the present invention can be applied to a so-called trickle charging method such that a self-discharge amount of the battery is always compensated.

Figure 9:
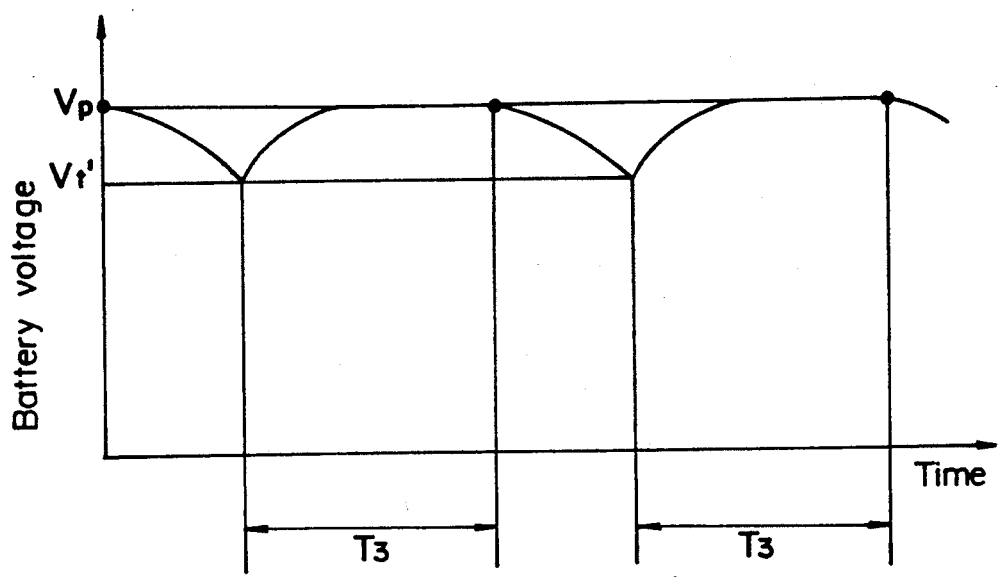
FIG. 9 is a graph illustrating a charging pattern in case of applying the charging method of the first preferred embodiment to a trickle charging method.

FIG. 9 shows an example that the charging method of the first preferred embodiment is applied to the trickle charging. More specifically, there is shown a charging pattern such that every time the battery voltage of the secondary battery fully charged lowers from the maximum voltage $V_p$ to a predetermined voltage $V_t'$ because of self discharge of the battery, the battery is charged for a predetermined period $T_3$ of time.

During the predetermined period $T_3$, the battery voltage is raised to the original maximum voltage $V_p$, and sufficient charging is carried out. When the battery voltage lowers again to the predetermined voltage $V_t'$ because of the self discharge, the same charging operation as above is repeated. Thus, the self-discharge amount of the battery is always compensated.

Figure 10:
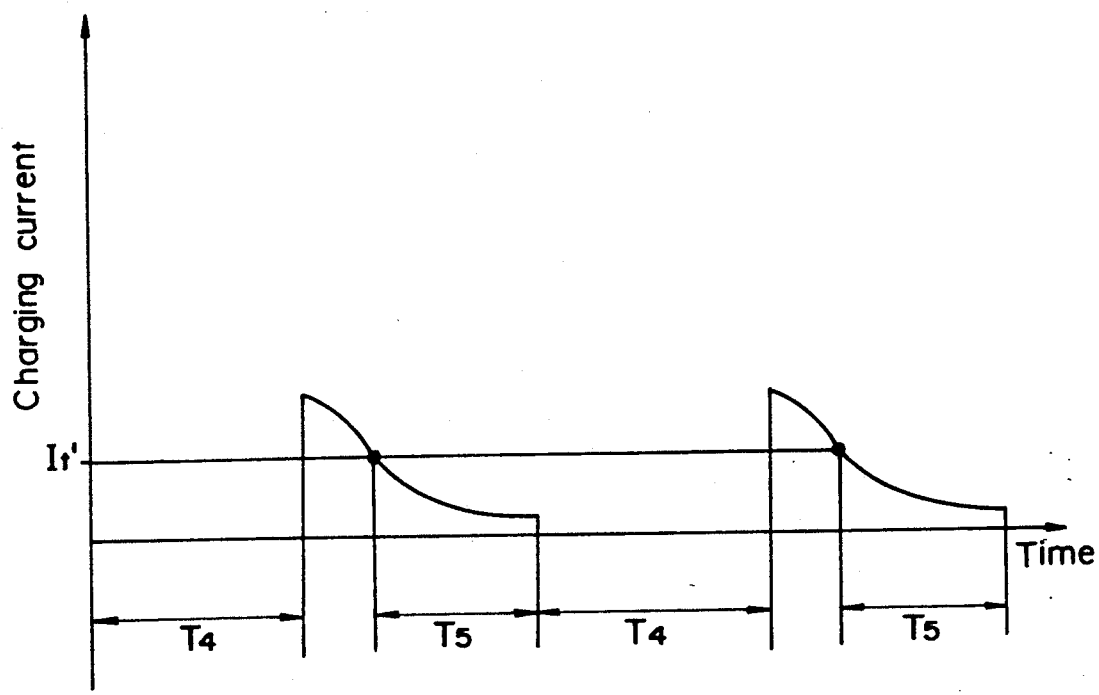
FIG. 10 is a graph illustrating a charging pattern in case of applying the charging method of the second preferred embodiment to a trickle charging method.

FIG. 10 shows another example that the charging method of the second preferred embodiment is applied to the trickle charging. More specifically, there is shown a charging pattern such that every time the self discharge of the secondary battery fully charged is considered to occur during a predetermined period $T_4$ of time, charging is started after the predetermined period $T_4$ has elapsed, and is continued until the charging current lowers to a predetermined current $I_t'$, then further being continued for a predetermined period $T_5$ of time.

During the predetermined period $T_5$, the battery is sufficiently charged. When the self discharge occurs again for the predetermined period $T_4$, the same charging operation as above is repeated. Thus, the self discharge amount of the battery is always compensated.

The above-mentioned trickle charging method can be easily realized by additionally providing a timer and means for detecting the predetermined value $V_t'$ or $I_t'$ in the controller 3 of the charging device shown in FIG. 2 or FIG. 4.

According to the trickle charging method of the above-mentioned applied example, the self discharge of the battery can be always compensated without overcharge.

It is to be noted that the application of the charging method of the present invention is not limited to the nonaqueous electrolyte secondary battery employed in the preferred embodiments and the applied example, but the present invention may be applied to any other secondary batteries.

What is claimed is:

1. A method of charging a secondary battery by means of a constant voltage power source for supplying a limited current, said method comprising a first step of charging said secondary battery until a predetermined condition is reached, and a second step of further charging said secondary battery for a first predetermined period of time after said predetermined condition is reached, wherein said predetermined condition is that a charging current of said secondary battery lowers to a first predetermined current, and further comprising a third step of repeatedly charging said secondary battery after said second step after a second predetermined period of time has elapsed until said charging current lowers to a second predetermined current and then further charging said secondary battery for a third predetermined period of time after said second predetermined current is reached.

* * * * *